(12) United States Patent
Sai

(10) Patent No.: US 11,958,276 B2
(45) Date of Patent: Apr. 16, 2024

(54) METAL-RESIN JOINT AND METHOD FOR MANUFACTURING METAL-RESIN JOINT

(71) Applicant: Mutsuki Electric Co., Ltd., Osaka (JP)

(72) Inventor: Seiichi Sai, Osaka (JP)

(73) Assignee: MUTSUKI ELECTRIC CO., LTD., Osaka (JP)

(*) Notice: Subject to any disclaimer, the term of this patent is extended or adjusted under 35 U.S.C. 154(b) by 314 days.

(21) Appl. No.: 17/617,348

(22) PCT Filed: Aug. 7, 2020

(86) PCT No.: PCT/JP2020/030478
§ 371 (c)(1),
(2) Date: Dec. 8, 2021

(87) PCT Pub. No.: WO2022/030015
PCT Pub. Date: Feb. 10, 2022

(65) Prior Publication Data
US 2022/0410523 A1 Dec. 29, 2022

(51) Int. Cl.
B32B 3/06 (2006.01)
B23K 26/0622 (2014.01)
(Continued)

(52) U.S. Cl.
CPC ............ *B32B 3/06* (2013.01); *B23K 26/0622* (2015.10); *B23K 26/364* (2015.10); *B29C 65/44* (2013.01);
(Continued)

(58) Field of Classification Search
CPC .............. B23K 26/0622; B23K 26/364; B23K 2103/04; B23K 2103/08; B23K 2103/26; B23K 26/0869; B29C 65/16; B29C 65/44; B29C 66/30322; B29C 66/30325; B29C 65/46; B29C 65/8253; B29C 66/0246; B29C 66/026; B29C 66/1122; B29C 66/45; B29C 66/7212; B29C 66/7392; B29C 66/742; B29C 66/8242; B29C 66/8322; B29C 66/91445; B29C 66/91921; B29C 66/91933; B29C 66/91935; B29C 66/929;
(Continued)

(56) References Cited

FOREIGN PATENT DOCUMENTS

| CN | 105522780 A | 4/2016 |
|---|---|---|
| JP | 2019-31054 A | 2/2019 |

OTHER PUBLICATIONS

Office Action dated Oct. 28, 2023, issued in counterpart CN application No. 202080013692.7 with English machine translation. (21 pages).

*Primary Examiner* — Lynda Salvatore
(74) *Attorney, Agent, or Firm* — WHDA, LLP

(57) ABSTRACT

There are provided a metal-resin joint having high bonding strength and a manufacturing method thereof. A metal-resin joint 10 of the present disclosure includes an anchor portion 34 provided on a metal bonding surface 32 of a metal member 30. The anchor portion 34 has a pair of protrusion strips 35 and 35 protruding from the metal bonding surface 32 with a gap, a recessed groove 36 provided between the pair of protrusion strips 35 and 35, and a plurality of partitions 37 protruding from a groove bottom of the recessed groove 36. The plurality of partitions 37 are provided to be inclined toward one side Y1 in a direction in which the pair of protrusion strips 35 and 35 extend as going toward a distal end side, and to be side by side in a direction Y in which the pair of protrusion strips 35 and 35 extend.

11 Claims, 13 Drawing Sheets

(51) Int. Cl.
| | |
|---|---|
| *B23K 26/364* | (2014.01) |
| *B29C 65/00* | (2006.01) |
| *B29C 65/16* | (2006.01) |
| *B29C 65/44* | (2006.01) |
| *B32B 15/08* | (2006.01) |
| *B32B 15/18* | (2006.01) |

(52) U.S. Cl.
CPC .. *B29C 66/30322* (2013.01); *B29C 66/30325* (2013.01); *B32B 15/08* (2013.01); *B32B 15/18* (2013.01); *B29C 65/16* (2013.01); *B32B 2255/06* (2013.01); *B32B 2255/20* (2013.01)

(58) Field of Classification Search
CPC ..... B32B 15/08; B32B 15/18; B32B 2255/06; B32B 2255/20; B32B 3/06; B32B 27/286; B29K 2307/04; B29K 2309/08; B29K 2509/14

See application file for complete search history.

[FIG. 1]
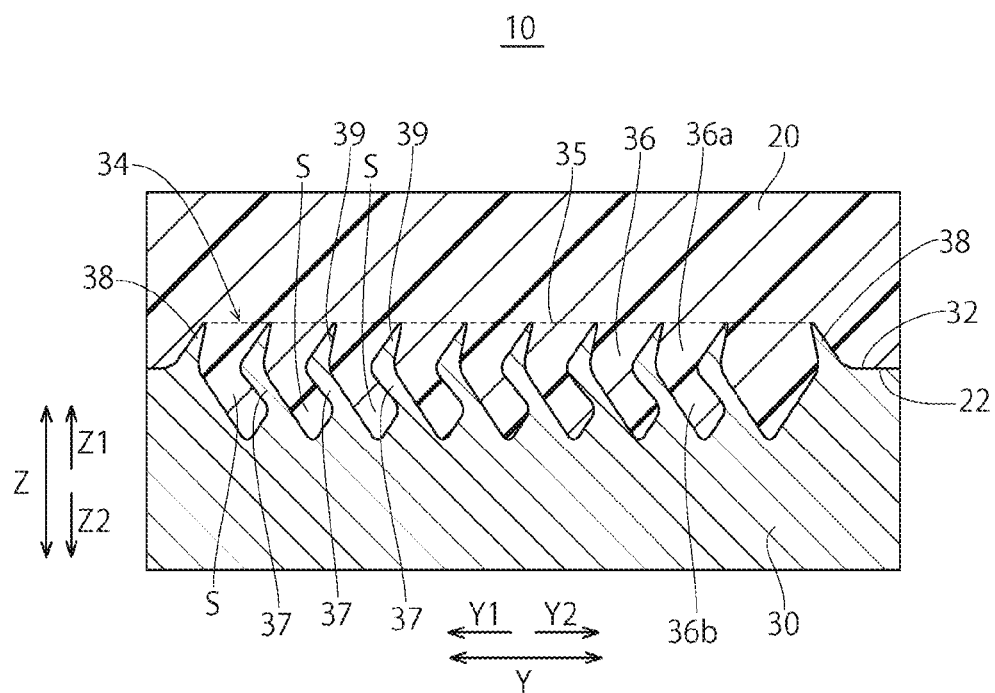

[FIG. 2]
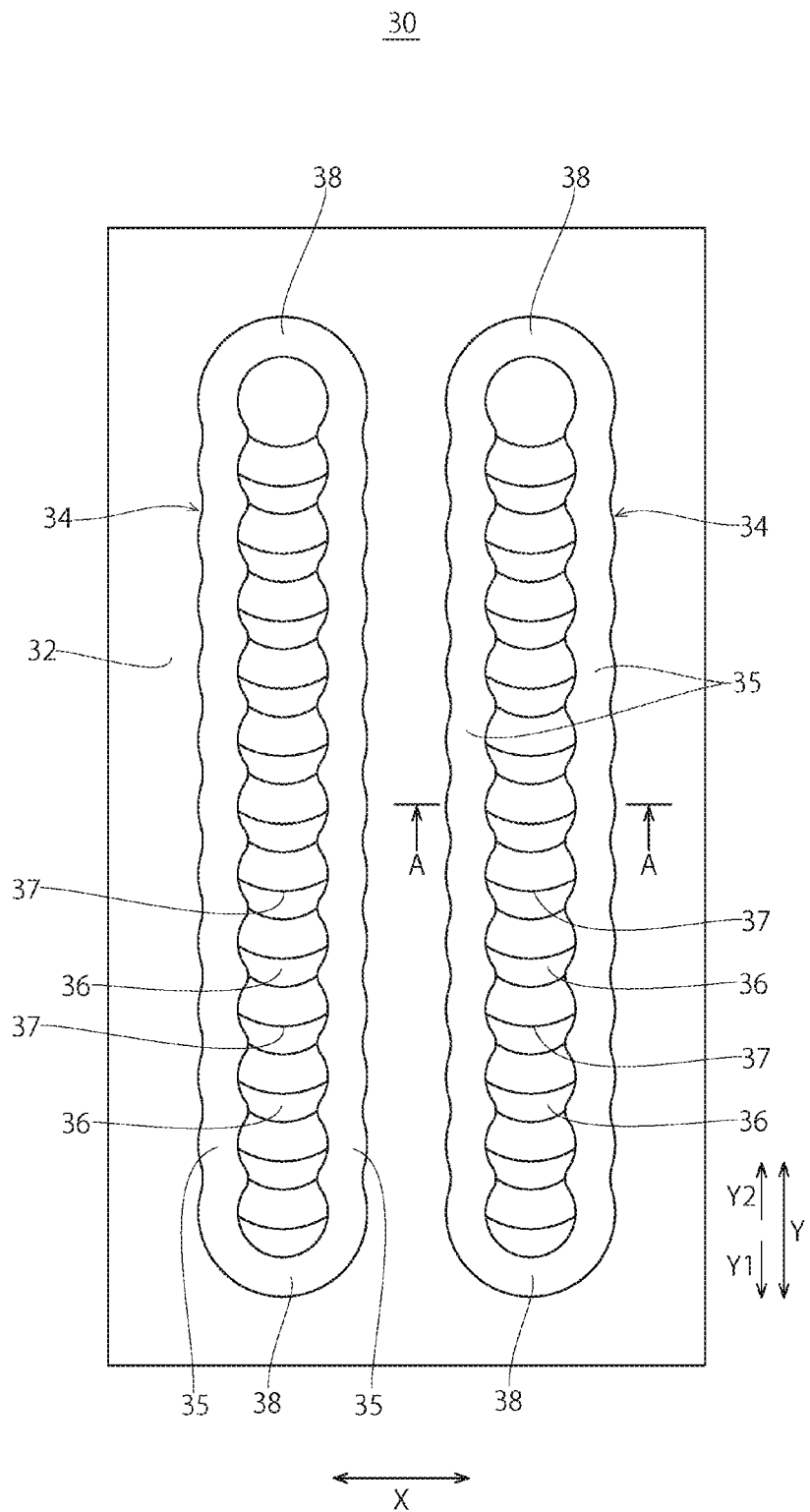

[FIG. 3]
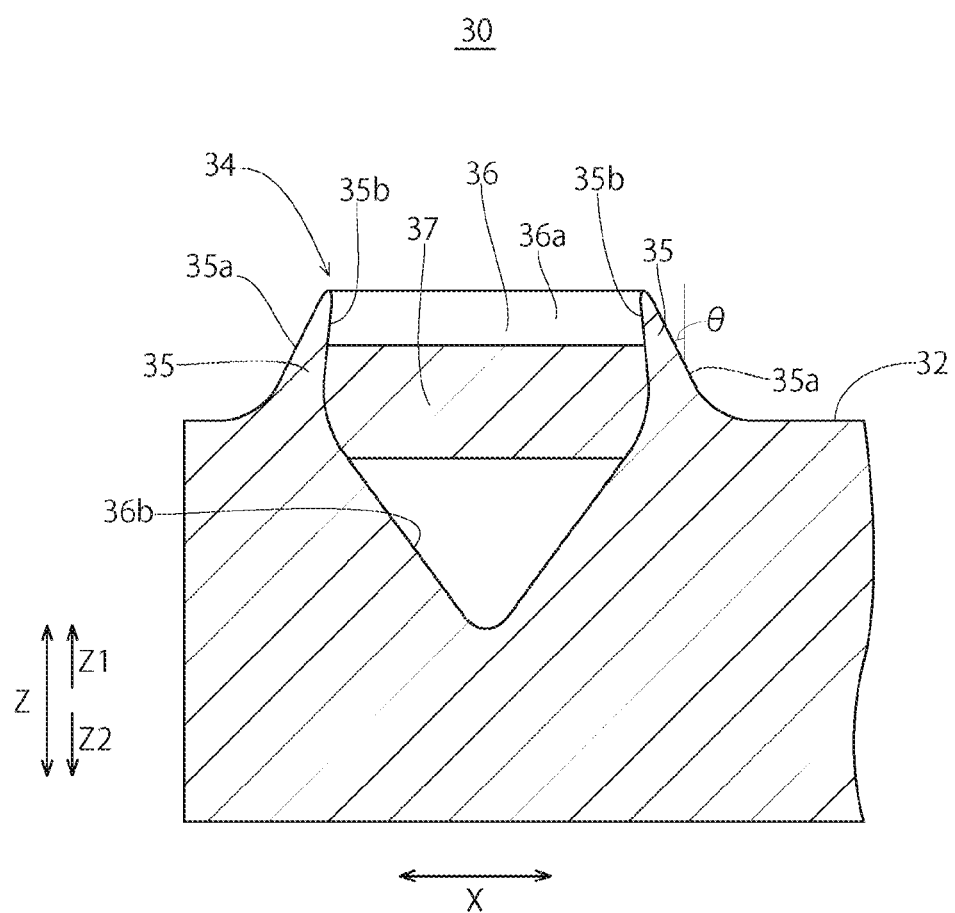

[FIG. 4]
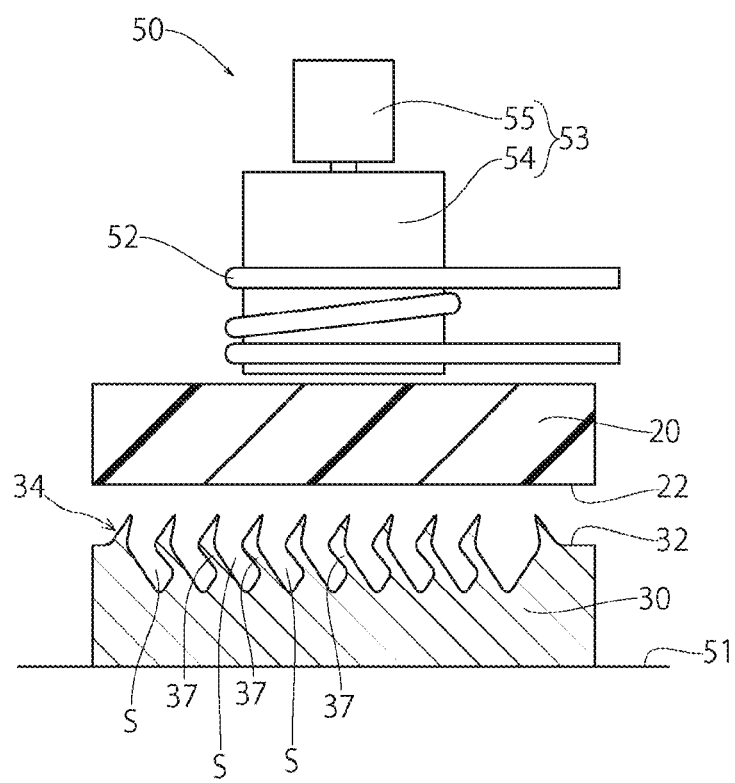

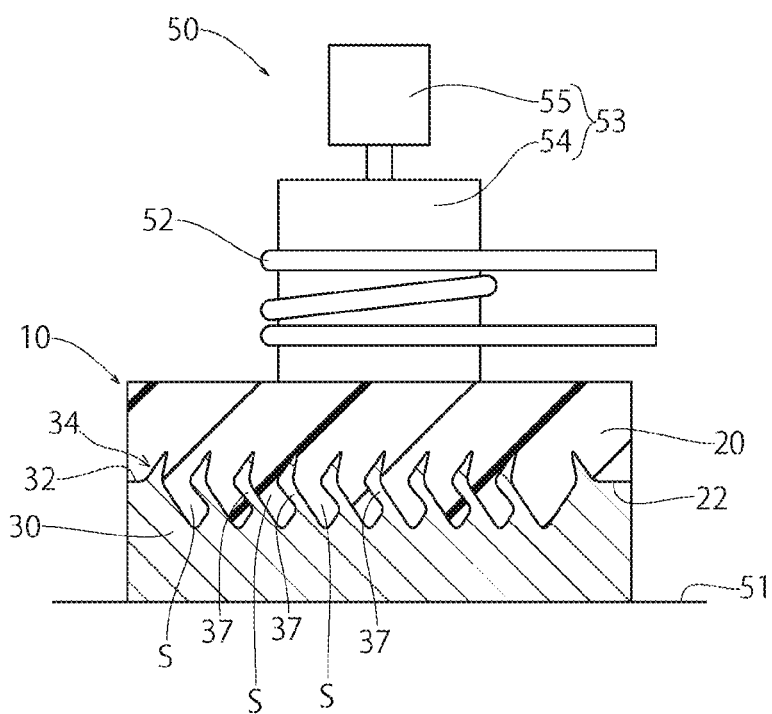
[FIG. 5]

[FIG. 6]
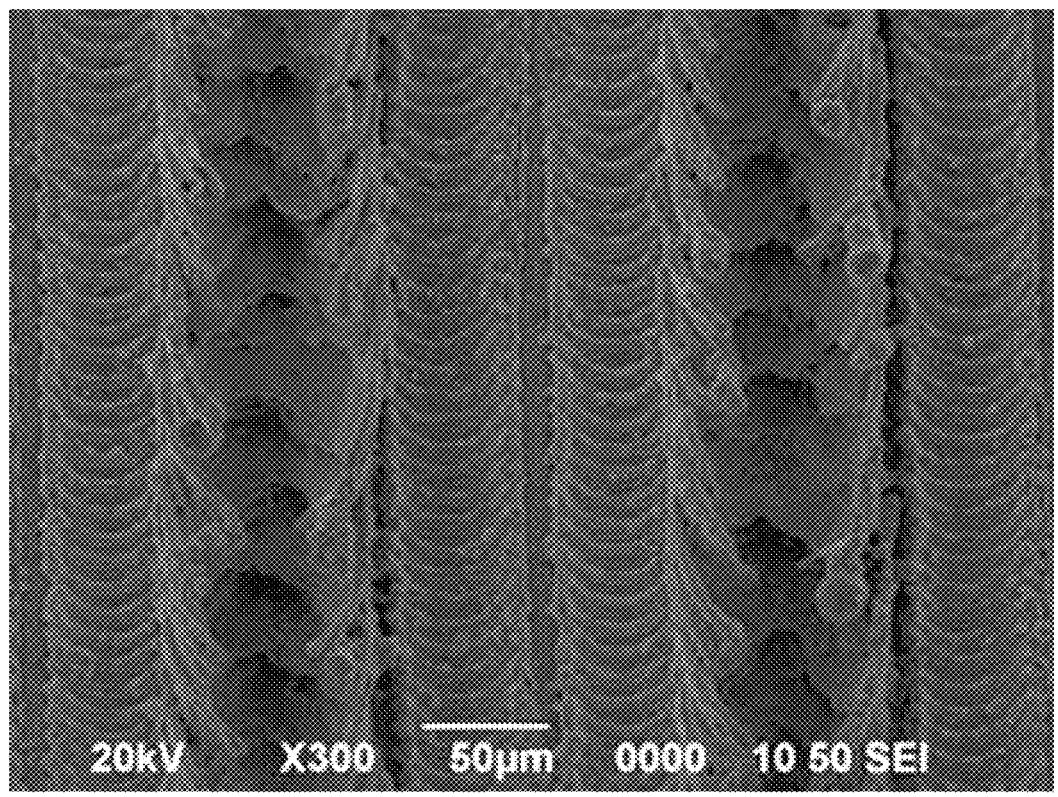

[FIG. 7]
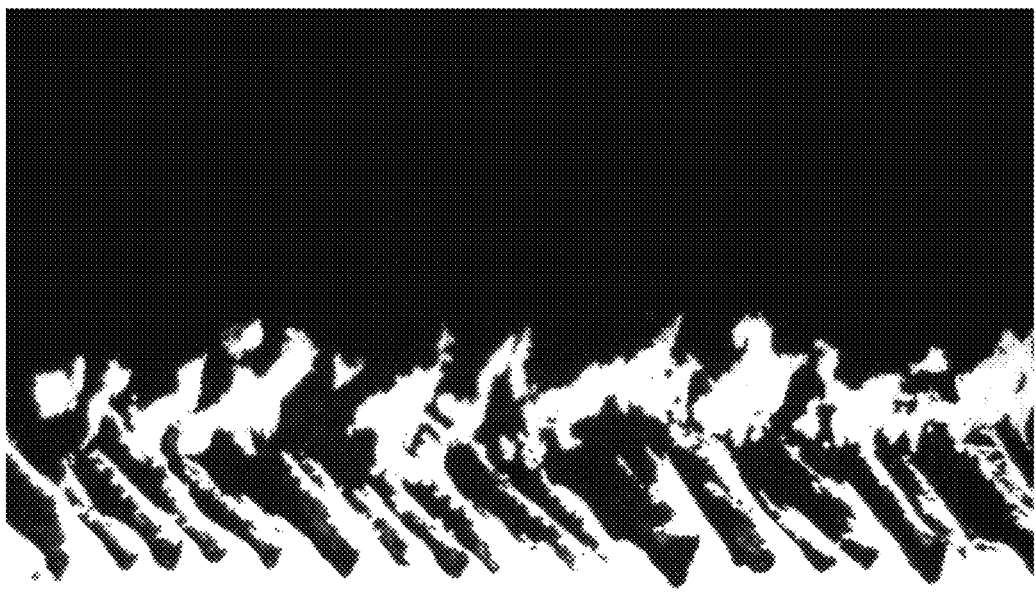

[FIG. 8]
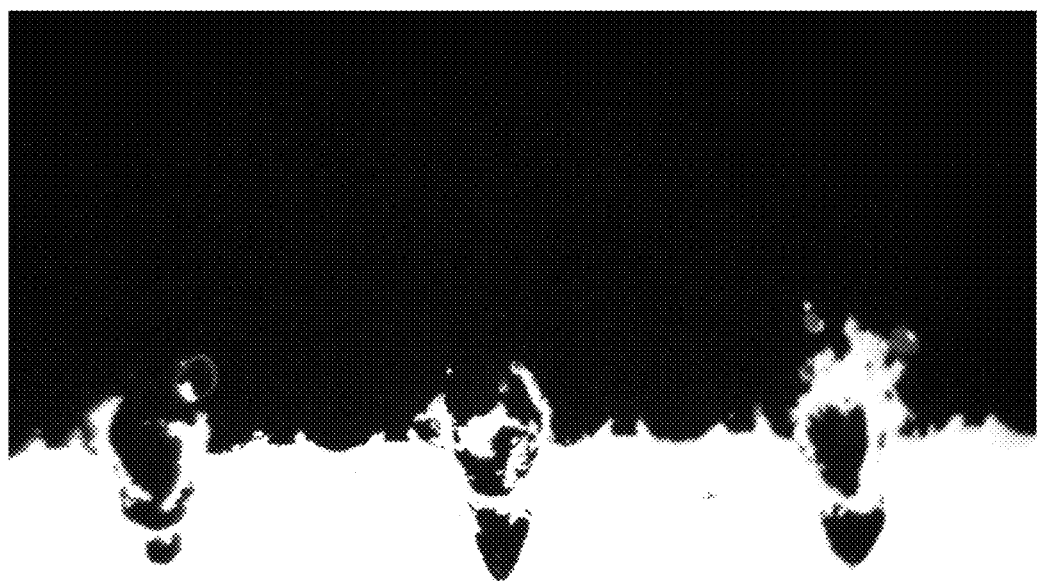

[FIG. 9]
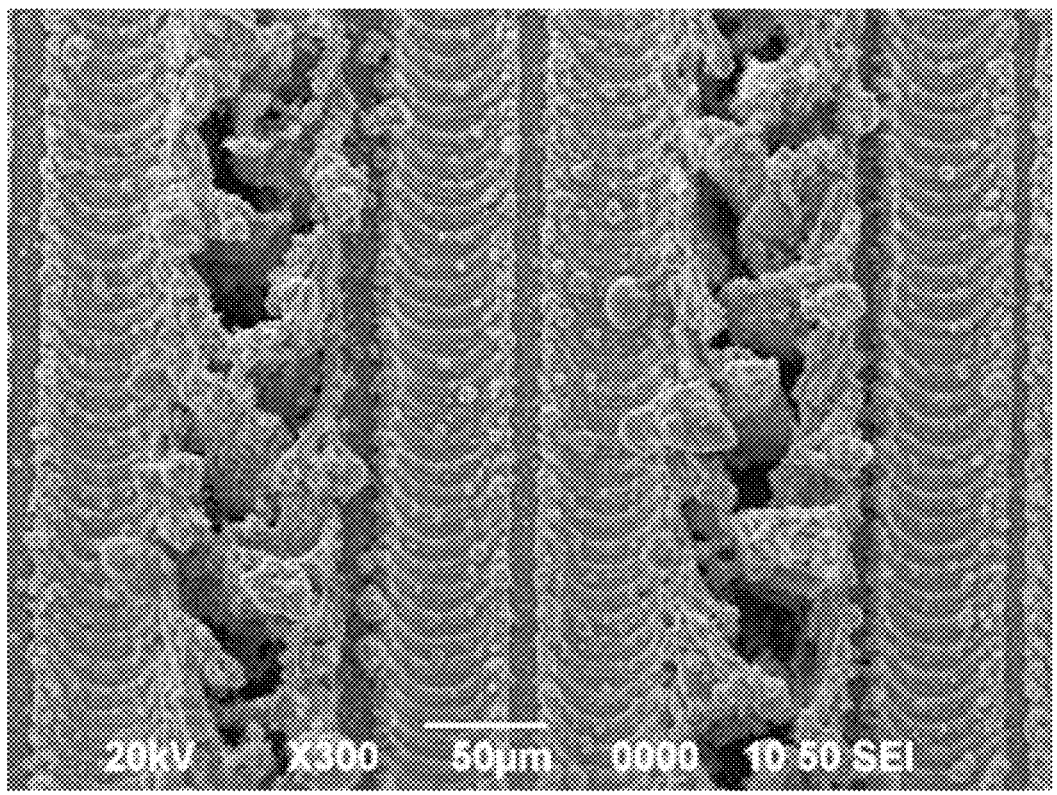

[FIG. 10]

[FIG. 11]
100.00 μm/div
2020/04/08

[FIG. 12]
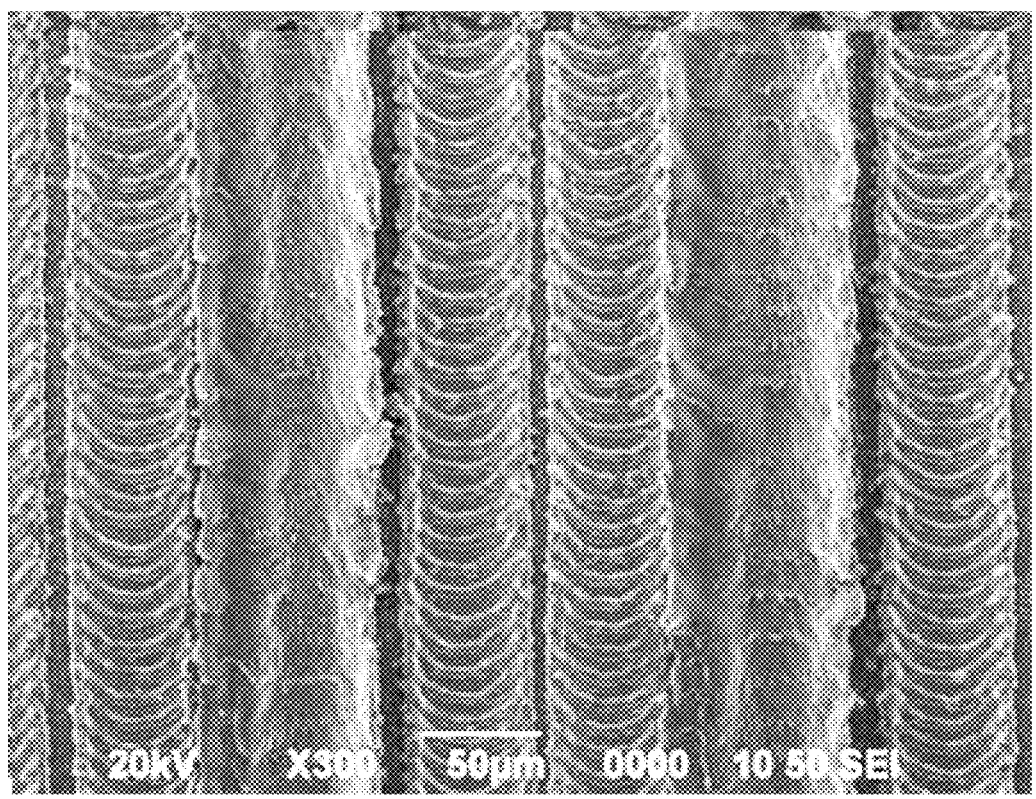

[FIG. 13]
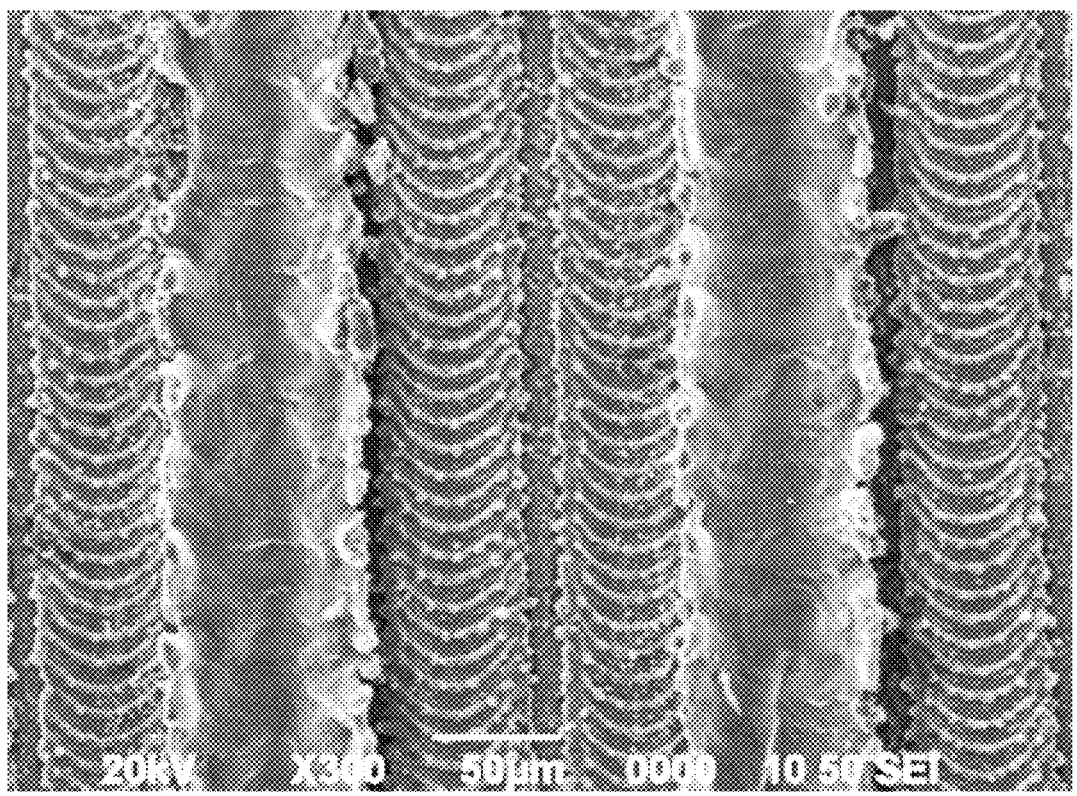

METAL-RESIN JOINT AND METHOD FOR MANUFACTURING METAL-RESIN JOINT

TECHNICAL FIELD

The present disclosure relates to a metal-resin joint and a method for manufacturing a metal-resin joint.

BACKGROUND ART

A metal-resin joint made by bonding a metal member made of metal and a synthetic resin member made of synthetic resin is known (for example, refer to Patent Literature 1 described below). In the metal-resin joint, in order to increase the bonding strength between the metal member and the synthetic resin member, various methods are suggested, such as forming an anchor having an uneven shape on the surface of the metal member, but further improvement of the bonding strength is required.

CITATION LIST

Patent Literature

PTL 1: Japanese Unexamined Patent Publication JP-A 2019-31054

SUMMARY OF INVENTION

Technical Problem

The present disclosure is made in consideration of the above-described points, and an object of the present disclosure is to provide a metal-resin joint and a method for manufacturing a metal-resin joint that can improve the bonding strength between a metal member made of metal and a synthetic resin member made of thermoplastic resin material.

Solution to Problem

According to the present embodiment, the following aspects [1] to [7] are provided.

[1] A metal-resin joint in which a synthetic resin member made of thermoplastic resin and a metal member made of metal are provided, and the synthetic resin member is bonded to a metal bonding surface of the metal member provided with an anchor portion, in which the anchor portion has a pair of protrusion strips protruding from the metal bonding surface with a gap, a recessed groove provided between the pair of protrusion strips, and a plurality of partitions protruding from a groove bottom of the recessed groove, and the plurality of partitions are provided to be inclined toward one side in a direction in which the pair of protrusion strips extend as going toward a distal end side, and to be side by side in the direction in which the pair of protrusion strips extend.

[2] The metal-resin joint according to [1], in which an inclination angle of an outer surface of the pair of protrusion strips with respect to a thickness direction of the metal member is less than 45 degrees.

[3] The metal-resin joint according to [1] or [2], in which the pair of protrusion strips have an undercut shape in which an opening end of the recessed groove becomes narrower.

[4] The metal-resin joint according to any one of [1] to [3], in which a metal oxide is provided on a surface of the anchor portion.

[5] The metal-resin joint according to any one of [1] to [4], in which a plurality of the anchor portions are provided side by side in a direction perpendicular to the direction in which the pair of protrusion strips extend on the metal bonding surface, and the plurality of partitions provided in the anchor portions adjacent to each other are inclined in directions opposite to each other.

[6] A method for manufacturing a metal-resin joint in which a synthetic resin member made of thermoplastic resin is bonded to a metal bonding surface of a metal member made of metal, the method including: an anchor formation process of forming an anchor portion by irradiating the metal bonding surface with a pulsed laser beam that satisfies the following conditions: a spot gap M expressed in Equation (1) below is equal to or less than two times a laser spot radius R; a laser power coefficient n expressed in Equation (2) below is 0.2 or higher and 300 or lower; and an intensity U expressed in Equation (3) below is $1.0\times10^5$ W/mm² or higher and $1.0\times10^9$ W/mm² or lower; and a bonding process of bringing the resin bonding surface into contact with the metal bonding surface while pressurizing in a state where the metal member and the synthetic resin member are heated after the anchor formation process.

$$M=V/Q \qquad \text{Equation (1)}$$

$$n=E/(V \times L \times R \times C \times H) \qquad \text{Equation (2)}$$

$$U=E/(2\pi R^2 \times Q \times B) \qquad \text{Equation (3)}$$

In equations (1) to (3), V is a scanning speed of a laser beam (mm/sec), Q is a frequency of the laser beam (Hz), E is laser power (W), L is an actual measured value of a depth of a groove formed on the metal bonding surface by the irradiation of the laser beam, R is a spot radius of the laser beam (mm), C is a specific gravity of the metal that makes the metal member (g/mm³), H is evaporation heat of the metal that makes the metal member (J/g), and B is a pulse half-width of the laser beam (sec).

[7] The method for manufacturing a metal-resin joint according to [6], in which the bonding process includes a process of releasing the pressure after cooling the metal member and the synthetic resin member until reaching a temperature equal to or lower than a glass transition temperature.

Advantageous Effects of Invention

In the present disclosure, a metal-resin joint having high bonding strength between a metal member and a synthetic resin member can be obtained.

BRIEF DESCRIPTION OF DRAWINGS

FIG. 1 is a sectional view illustrating a schematic configuration of a metal-resin joint according to one embodiment of the present disclosure.

FIG. 2 is a plan view illustrating a schematic configuration of a bonding surface of a metal member that configures the metal-resin joint of FIG. 1.

FIG. 3 is an A-A sectional view of FIG. 2.

FIG. 4 is a view illustrating a first process of a method for manufacturing a metal-resin joint according to one embodiment of the present disclosure.

FIG. 5 is a view illustrating a second process of the method for manufacturing a metal-resin joint according to one embodiment of the present disclosure.

FIG. 6 is an SEM photograph of a metal bonding surface of a metal member in Example 1.

FIG. 7 is an SEM photograph of a cross section of the metal member in Example 1.

FIG. 8 is an SEM photograph of a cross section of the metal member in Example 1.

FIG. 9 is an SEM photograph of a metal bonding surface of a metal member in Example 6.

FIG. 10 is an SEM photograph of a cross section of the metal member in Example 6.

FIG. 11 is an SEM photograph of a cross section of the metal member in Example 6.

FIG. 12 is an SEM photograph of a metal bonding surface of a metal member in Comparative Example 1.

FIG. 13 is an SEM photograph of a metal bonding surface of a metal member in Comparative Example 5.

DESCRIPTION OF EMBODIMENTS

Hereinafter, embodiments of the present disclosure will be described with reference to the drawings. The present disclosure is not limited to the following embodiments. The following embodiments are presented as examples and are not intended to limit the scope of the invention. The new embodiments can be implemented in various other forms, and various omissions, substitutions, and changes can be made without departing from the gist of the invention.

(1) Metal-Resin Joint 10

First, a metal-resin joint 10 of the present embodiment will be described. As illustrated in FIG. 1, the metal-resin joint 10 includes a synthetic resin member 20 made of thermoplastic resin and a metal member 30 made of metal, and a surface (hereinafter, there is a case where the surface is referred to as "resin bonding surface") 22 of the synthetic resin member 20 and a surface (hereinafter, there is a case where the surface is referred to as "metal bonding surface") 32 of the metal member 30 are bonded to each other.

(2) Synthetic Resin Member 20

The synthetic resin member 20 is a member made by molding the thermoplastic resin into a predetermined shape, such as a block, plate, or wire shape. The synthetic resin member 20 may be a coating film of thermoplastic resin or an adhesive layer made of thermoplastic resin adhesive. Specific examples of the thermoplastic resin that makes the synthetic resin member 20 include polypropylene resin (PP resin), polyacetal resin (POM resin), polyphenylene sulfide resin (PPS resin), polyetheretherketone resin (PEEK), acrylonitrile/butadiene/styrene resin (ABS resin), polyethylene resin (PE resin), polybutylene terephthalate resin (PBT resin), polyamide resin (PA resin) such as nylon 66 (PA66), epoxy resin, liquid crystal polymer (ECP resin), modified polyphenylene ether resin (modified PPE), and reactor type soft polypropylene resin (metallocene reactor type TPU resin). The synthetic resin member 20 may be made of a carbon fiber reinforced thermoplastic resin (CFRTP), in which carbon fibers are blended into the above-described thermoplastic resin, or a resin, in which a reinforcing material such as glass fiber or talc, flame retardants, degradation inhibitors, and elastomer components are blended into the above-described thermoplastic resin.

(3) Metal Member 30

The metal member 30 is a member obtained by molding the metal into a predetermined shape, such as a block, plate, or wire shape. A metal that makes the metal member 30 is not particularly limited, and various types of metals can be used. For example, copper (Cu), iron (Fe), aluminum (Al), titanium (Ti), nickel (Ni), chromium (Cr), and the like can be used as the metal that makes the metal member 30. The metal member 30 may be made of an alloy consisting of two or more metals, such as copper alloy, iron alloy (steel material), aluminum alloy, stainless steel, titanium alloy, nickel alloy, and chromium alloy.

The shape of the metal member 30 can be any desired shape depending on the application or the like. As the method for molding the metal member 30, any method can be applied, and casting by pouring molten metal into a mold having a desired shape, cutting using a machine tool or the like, punching using a press machine or the like, and the like may be used.

The metal member 30 may also have an oxide film (metal oxide) formed on the metal bonding surface 32 or in an anchor portion 34 which will be described later. The oxide film may be a natural oxide film which is naturally formed on the surface of metal. The oxide film may be formed on the surface of the metal member 30 by surface treatment with an oxidant, electrolytic treatment with anodic oxidation, plasma oxidation treatment, heat oxidation treatment in the oxygen-containing gas, and the like.

As a preferable aspect, the oxide film may be formed on the surface of the metal member 30 by rapidly heating the surface of the metal member 30 under an atmosphere of the oxygen-containing gas, such as in the air. It is preferable that the rising temperature of the surface of the metal member 30 per minute during rapid heating is equal to or higher than the melting point temperature of the metal that makes the metal member 30. By rapidly heating the surface of the metal member 30 in this manner, a dense oxide film can be formed on the surface of the metal member 30. Furthermore, by rapidly heating the surface of the metal member 30, microcracks are generated on the surface of the oxide film, and a bonding area with the synthetic resin member 20 becomes larger.

Although the surface of the metal member 30 can be heated rapidly by various methods such as laser heating, induction heating, or resistor heating, the temperature raising speed at the time of heating is fast and the temperature control is easy, and thus, it is preferable to heat the surface of the metal member 30 by irradiating a laser beam to form the oxide film.

On the metal bonding surface 32 of the metal member 30, the roughening treatment is performed and the anchor portion 34 is provided.

(4) Anchor Portion 34

As illustrated in FIGS. 1 to 3, the anchor portion 34 formed on the metal bonding surface 32 includes: a pair of protrusion strips 35 and 35 provided in a predetermined direction (hereinafter, this direction is referred to as first direction) X with a gap; a recessed groove 36 provided between the pair of protrusion strips 35 and 35; and a plurality of partitions 37 that protrude from the groove bottom of the recessed groove 36.

The pair of protrusion strips 35 and 35 are stripe-shaped projections in which the projections protruding from the metal bonding surface 32 extend in a direction (hereinafter, this direction is referred to as a second direction) Y perpendicular to the first direction X. Both end portions of the pair of protrusion strips 35 and 35 in the second direction Y may be connected to each other by a terminal end portion 38 as illustrated in FIG. 2.

In the present embodiment, as illustrated in FIG. 2, two anchor portions 34 are provided on the metal bonding surface 32 in the first direction X with a gap. However, one anchor portion 34 may be provided on the metal bonding surface 32, and three or more anchor portions 34 may be provided on the metal bonding surface 32 in the first direction X with a gap. In a case where the plurality of anchor portions 34 are provided on the metal bonding surface 32, the protrusion strip 35 that configures one anchor portion 34 may be provided parallel to the protrusion strip 35 that configures the other anchor portion 34, or may be provided so as to be inclined.

Outer surfaces 35a and 35a of the pair of protrusion strips 35 and 35 are preferably surfaces that rise steeply from the metal bonding surface 32, and an angle θ of the metal member 30 with respect to a thickness direction Z is preferably smaller than 45 degrees (refer to FIG. 3).

It is also preferable that inner surfaces 35b and 35b of the pair of protrusion strips 35 and 35 are inclined such that a gap in the first direction X becomes narrower as moving away from the metal bonding surface 32 to one side Z1 of the metal member 30 in the thickness direction Z. In other words, the pair of protrusion strips 35 and 35 have preferably an undercut shape in which a groove width of the recessed groove 36 becomes narrower as approaching an opening end of the recessed groove 36.

The recessed groove 36 has an upper recessed groove 36a, which is divided between the pair of protrusion strips 35 and 35 protruding from the metal bonding surface 32, and a lower recessed groove 36b, which is provided at the far side of the upper recessed groove 36a.

The upper recessed groove 36a is a space formed on one side Z1 of the metal member 30 in the thickness direction from the metal bonding surface 32. In a case where the pair of protrusion strips 35 and 35 have an undercut shape, the upper recessed groove 36a becomes a space where the groove width widens as going toward the groove bottom side.

The lower recessed groove 36b is a space that recesses from the metal bonding surface 32 to the other side Z2 of the metal member 30 in the thickness direction. The lower recessed groove 36b is a tapered space where the groove width becomes narrower as going toward the groove bottom side.

As illustrated in FIG. 2, the above-described recessed groove 36 is divided in the second direction V by the plurality of partitions 37 that protrude from the groove bottom of the recessed groove 36 to one side Z1 of the metal member 30 in the thickness direction. The plurality of partitions 37 are inclined in the same direction, as illustrated in FIG. 1. Specifically, the partitions 37 have an undercut shape that is inclined toward one side Y1 in the second direction Y in which the pair of protrusion strips 35 and 35 extend as going toward the distal end side from the groove bottom of the recessed groove 36.

The plurality of partitions 37 are provided side by side in the second direction with a gap. Accordingly, the plurality of partitions 37 divide the lower recessed groove 36b in the second direction Y, and form a space S between the partitions 37 adjacent to each other in the second direction Y, which is inclined toward one side Y1 in the second direction as going toward one side Z1 of the metal member 30 in the thickness direction from the groove bottom of the recessed groove 36.

The plurality of partitions 37 may be provided substantially parallel to each other as illustrated in FIG. 1, or may have different inclination angles from each other.

As illustrated in FIG. 1, the plurality of partitions 37 may be provided with a protrusion portion 39 that protrudes toward one side Z1 of the metal member 30 in the thickness direction at the distal end portion thereof and divides the upper recessed groove 36a in the second direction Y. The protrusion portion 39 may be provided so as to be inclined toward the opposite side of the partition 37 and be directed toward the other side Y2 in the second direction as going toward one side Z1 of the metal member 30 in the thickness direction.

The partition 37 may be provided from the groove bottom of the recessed groove 36 to the metal bonding surface 32 as illustrated in FIG. 1, or the partition 37 may be provided to be inclined toward one side Y1 in the second direction from the groove bottom of the recessed groove 36 to the opening end of the recessed groove 36.

In a case where the plurality of anchor portions 34 are provided on the metal bonding surface 32 in the first direction X with a gap, the partitions 37 provided in the anchor portions 34 adjacent to each other in the first direction X may be provided so as to be inclined in the directions opposite to each other. In other words, the partition 37 provided in one anchor portion 34 may have an undercut shape inclined toward one side Y1 in the second direction as going toward the distal end side from the groove bottom of the recessed groove 36, and the partition 37 provided in the other anchor portion 34 adjacent to the one anchor portion 34 in the first direction X may have an undercut shape inclined toward the other side Y2 in the second direction as going toward the distal end side from the groove bottom of the recessed groove 36.

(5) Method for Manufacturing Metal-Resin Joint 10

Next, a method for manufacturing the metal-resin joint 10 will be described.

First, the synthetic resin member 20 and the metal member 30, which are molded into a predetermined shape, are prepared. An anchor formation process of forming the anchor portion 34 on the metal bonding surface 32 of the metal member 30, is executed. After this, a bonding process of bonding the resin bonding surface 22 of the synthetic resin member 20 to the metal bonding surface 32 on which the anchor portion 34 is formed, is performed. Accordingly, the metal-resin joint 10 in which the synthetic resin member 20 is bonded to the metal bonding surface 32 of the metal member 30, is obtained. Hereinafter, the anchor formation process and the bonding process will be described in detail.

(5-1) Anchor Formation Process

In the anchor formation process, the metal bonding surface 32 to which the synthetic resin member 20 is bonded in the metal member 30 is intermittently irradiated with a laser beam while the irradiation position of the laser beam is moved (scanned) in the second direction. Specifically, the metal bonding surface 32 is irradiated with the pulsed laser beam that satisfies the following conditions: a spot gap M expressed in Equation (1) below is equal to or less than two times a laser spot radius R; a laser power coefficient n expressed in Equation (2) below is 0.2 or higher and 300 or lower; and an intensity U of the laser beam expressed in Equation (3) below is $1.0 \times 10^5$ W/mm$^2$ or higher and $1.0 \times 10^9$ W/mm$^2$ or lower, while the pulsed laser beam scans the other side Y2 in the second direction.

$$M = V/Q \qquad \text{Equation (1)}$$

$$n = E/(V \times L \times R \times C \times H) \qquad \text{Equation (2)}$$

$$U = E/(2\pi R^2 \times Q \times B) \qquad \text{Equation (3)}$$

In Equations (1) to (3), V is a scanning speed of a laser beam (mm/sec), Q is a frequency of the laser beam (Hz), E is laser power (W), L is an actual measured value of a depth of a groove formed on the metal bonding surface by the irradiation of the laser beam, R is a spot radius of the laser beam (mm), C is a specific gravity of the metal that makes the metal member 30 (g/mm$^3$), H is evaporation heat of the metal that makes the metal member (J/g), and B is a pulse half-width of the laser beam (sec).

The actual measured value I of the depth of the groove formed on the metal bonding surface by the irradiation of the laser beam is measured as follows. In other words, a specimen made of the same metal as the metal member 30 is irradiated with the laser so as to intersect one circumferential edge of the specimen. The irradiation of the laser is repeated five times to form five laser irradiation marks. For the five laser irradiation marks, the depth of the laser irradiation mark formed on the end surface of the specimen is measured using a measuring microscope (measuring microscope MM-800 manufactured by NIKON CORPORATION), and the average value of the five measured values is used as the actual measured value L of the depth of the groove formed on the metal bonding surface by the irradiation of the laser beam.

When the metal bonding surface 32 is irradiated with the pulsed laser beam, the metal at the position irradiated with the laser beam melts and is deposited around the irradiation position. Accordingly, the pair of protrusion strips 35 are formed on both sides in the first direction X at the position irradiated with the laser beam, and the recessed groove 36 is formed between the pair of protrusion strips 35. In the recessed groove 36, the plurality of partitions 37, which are inclined toward one side Y1 in the second direction (that is, rear side of the laser beam in a scanning direction) as going from the groove bottom to the distal end side, are formed in the second direction Y with a gap, and the space S is formed between the partitions 37 and 37 adjacent to each other in the second direction Y.

The spot gap M is preferably equal to or greater than $0.5 \times 10^{-4}$ mm, and is preferably equal to or less than the laser spot radius R. The laser power coefficient n is preferably 0.5 or higher and 50 or lower. The intensity U of the laser beam is preferably $1.0 \times 10^6$ W/mm$^2$ or higher and $1.0 \times 10^8$ W/mm$^2$ or lower. When the spot gap M is equal to or less than the laser spot radius R, the recessed groove 36 can be densely provided with the partition 37. When the spot gap M is equal to or greater than $0.5 \times 10^{-4}$ mm, the partition 37 formed during the irradiation of the laser beam is less likely to be destroyed by the irradiated laser beam after being formed. When the laser power coefficient n is 0.5 or higher and 50 or lower, it becomes easy to form the recessed groove 36 with an appropriate depth to the extent that the synthetic resin can reach the groove bottom when bonding the synthetic resin member 20. When the intensity U of the laser beam is $1.0 \times 10^6$ W/mm$^2$ or higher and $1.0 \times 10^8$ W/mm$^2$ or lower, it becomes easy to form the partition 37 with a large protrusion amount from the groove bottom of the recessed groove 36.

When the anchor portion 34 is formed by irradiating with the laser beam as described above in oxygen-containing gas, metal oxide is formed on the surface of the anchor portion 34.

In a case of forming the plurality of anchor portions 34 in the first direction X with a gap, the metal bonding surface 32 is irradiated with the pulsed laser beam while scanning with the pulsed laser beam the other side Y2 in the second direction at the position with a predetermined gap in the first direction X. In this case, by forming the anchor portions 34 adjacent to each other in the first direction X with the scanning direction of the laser beam in the opposite directions, the partitions 37 provided in the anchor portions 34 adjacent to each other in the first direction X can be formed so as to be inclined in directions opposite to each other.

Before irradiating the metal bonding surface 32 of the metal member 30 with the pulsed laser beam to form the anchor portion 34, pretreatment of irradiating a location where the anchor portion 34 is formed with the laser beam at least on the metal bonding surface 32 and removing impurities adhering to the metal bonding surface 32, may be performed.

(5-2) Bonding Process

In the bonding process, in a state where the metal member 30 and the synthetic resin member 20 are heated, the resin bonding surface 22 is brought into contact with the metal bonding surface 32 while being pressurized. Accordingly, the metal-resin joint 10 is obtained in which the synthetic resin member 20 is bonded to the metal bonding surface 32 of the metal member 30. In the present embodiment, the first process and the second process are performed using a bonding device 50 as illustrated in FIGS. 4 and 5 to manufacture the metal-resin joint 10.

The bonding device 50 includes: a stage 51 on which the metal member 30 is placed; a heating device 52 that inductively heats the metal member 30 placed on the stage 51; and a pressing device 53 that pressurizes and bonds the synthetic resin member 20 to the metal member 30.

The metal member 30 is placed on the stage 51 such that the metal bonding surface 32 provided with the anchor portion 34 faces the synthetic resin member 20.

The heating device 52 includes an induction heating coil connected to a power source device (not illustrated), and when a drive power source is input from the power source device, a magnetic field is generated from the induction heating coil to inductively heat the metal bonding surface 32 of the metal member 30 placed on the stage 51.

The pressing device 53 includes: a rod 54 formed of an insulator such as ceramics; and a pressurizing unit 55 that moves the rod 54 to press the synthetic resin member 20 against the metal bonding surface 32 of the metal member 30. The rod 54 may be inserted into a hollow part of the induction heating coil of the heating device 52 and disposed to face the synthetic resin member 20, as illustrated in FIG. 4. The pressurizing unit 55 preferably includes a pneumatic cylinder controlled by an electro-pneumatic regulator, a spring type pressurizer, or the like, and can control the speed at which the synthetic resin member 20 is moved together with the rod 54 and the pressure at which the synthetic resin member 20 is pressed against the metal member 30.

In order to manufacture the metal-resin joint 10 using the bonding device 50, first, the metal member 30 is placed on the stage 51 such that the metal bonding surface 32 provided with the anchor portion 34 faces the synthetic resin member 20 to be set after this in an atmosphere where gas is present.

Next, the synthetic resin member 20 is disposed such that the resin bonding surface 22 faces the metal bonding surface 32 of the metal member 30 placed on the stage 51 with a gap therebetween. The distance between the metal bonding surface 32 of the metal member 30 and the resin bonding surface 22 of the synthetic resin member 20 is set at 0.001 mm to 10 mm, for example.

Next, the heating device 52 is disposed to face the metal bonding surface 32 of the metal member 30 across the synthetic resin member 20. In a case illustrated in FIG. 4, the heating device 52 is disposed above the synthetic resin member 20, and the synthetic resin member 20 is disposed between the heating device 52 and the metal member 30.

Next, the first process of exposing the resin bonding surface 22 of the synthetic resin member 20 to a gas heated to a first temperature T1 is executed.

Specifically, the drive power source is supplied to the heating device 52 to generate a magnetic field from the induction heating coil provided in the heating device 52 and heat the metal bonding surface 32 of the metal member 30. At this time, the drive power source supplied to the heating device 52, the position of the induction heating coil provided in the heating device 52, or the like are adjusted such that the metal bonding surface 32 of the metal member 30 reaches the first temperature T1.

As the metal member 30 is heated as described above, the gas between the metal member 30 and the synthetic resin member 20 is heated to the first temperature T1. Accordingly, the resin bonding surface 22 of the synthetic resin member 20 facing the metal bonding surface 32 of the metal member 30 is exposed to the gas heated to the first temperature T1, and the resin bonding surface 22 reaches the first temperature T1. The heating device 52 heats the metal bonding surface 32 of the metal member 30 for a predetermined time S1 (for example, 1 to 10 seconds) to execute the first process as described above, and then completes the first process and moves to the second process.

When the first process is completed, in order to continue executing the second process, the heating device 52 stops heating or reduces the amount of heating of the metal member 30 such that the temperature of the resin bonding surface 22, the metal bonding surface 32, and the surrounding thereof (the gas between the metal member 30 and the synthetic resin member 20) is lowered (cooled) until reaching a second temperature T2. Then, the synthetic resin member 20 and the metal member 30 are bonded to each other at the second temperature T2.

In other words, in the second process, at a temperature (second temperature T2) lower than the first temperature T1, the pressing device 53 moves the synthetic resin member 20 at a predetermined speed V to make the synthetic resin member 20 collide with the metal member 30. At this time, the synthetic resin member 20 is pressed strongly against the metal member 30 at the position corresponding to a distal end of the rod 54, and is pressed against the metal member 30 at a predetermined pressure P. Accordingly, the metal-resin joint 10 is obtained in which the resin bonding surface 22 of the synthetic resin member 20 and the metal bonding surface 32 of the metal member 30 are locally (spot-like) bonded to each other. Then, the second process is completed.

The first temperature T1 can be a temperature which is equal to or higher than a deflection temperature under load Tf of the thermoplastic resin that makes the synthetic resin member 20 when a load of 1.8 MPa is applied. In a case where the synthetic resin member 20 is made of a resin in which a reinforcing material, such as carbon fiber, glass fiber, or talc, is blended into the thermoplastic resin, the deflection temperature under load Tf of the thermoplastic resin that makes the synthetic resin member 20 when a load of 1.8 MPa is applied is the deflection temperature under load Tf of the thermoplastic resin that does not contain the reinforcing material when a load of 1.8 MPa is applied.

An upper limit value of the first temperature T1 can be a temperature which is equal to or lower than a decomposition temperature of the thermoplastic resin that makes the synthetic resin member 20, that is, can be a temperature which is lower than a temperature at which the thermoplastic resin begins to vaporize. As an example, the upper limit value of the first temperature T1 may be 1000° C. Preferably, the upper limit value of the first temperature T1 can be set to a temperature which is 20° C. higher than a melting point Tm of the thermoplastic resin that makes the synthetic resin member 20.

The second temperature T2 may be a temperature lower than the first temperature T1, but is preferably equal to or higher than the deflection temperature under load Tf of the thermoplastic resin that makes the synthetic resin member 20 when a load of 1.8 MPa is applied. The second temperature 12 is preferably lower than the melting point Tm of the thermoplastic resin that makes the synthetic resin member 20. The temperature difference between the first temperature T1 and the second temperature T2 is preferably 1° C. or higher and 20° C. or lower.

In the present specification, the melting point Tm of the thermoplastic resin is a value measured at a temperature raising speed of 10° C. per minute using a differential scanning calorimeter according to JIS K7121. The melting points of typical thermoplastic resins are 168° C. for polypropylene resin, 265° C. for nylon 66, 232 to 267° C. for polybutylene terephthalate resin, and 280° C. for polyphenylene sulfide resin.

The deflection temperature under load Tf of the thermoplastic resin is a deflection temperature under load measured by a method according to JIS K7191 when a load of 1.8 MPa is applied. The deflection temperatures under load Tf of typical thermoplastic resins when a load of 1.8 MP is applied are 57 to 65° C. for polypropylene resin, 66 to 68° C. for nylon 66, 58° C. for polybutylene terephthalate resin, and 105° C. for polyphenylene sulfide resin.

The first process is preferably executed in the oxygen-containing gas such as air. In other words, it is preferable to heat the metal bonding surface 32 and the resin bonding surface 22 to the first temperature T1 in an atmosphere of oxygen-containing gas, and expose the metal bonding surface 32 and the resin bonding surface 22 to the oxygen-containing gas heated to the first temperature T1.

When the first process is executed in an atmosphere of the oxygen-containing gas, the resin bonding surface 22 of the synthetic resin member 20 reacts with the oxygen contained in the oxygen-containing gas to generate functional groups that can be chemically bound by neutralization reactions with basic or amphoteric oxides, on the resin bonding surface 22 of the synthetic resin member 20.

In general, the surface of the metal member 30 is oxidized and coated with an oxide film made of metal oxides, and thus, the functional groups generated on the resin bonding surface 22 are bonded to the metal oxides on the metal bonding surface 32 of the metal member 30 by van der Waals forces or hydrogen bonds. In addition, by bonding the synthetic resin member 20 and the metal member 30 to each other in a heated and pressurized state, the functional groups of the resin bonding surface form covalent binding with the metal oxide of the metal member 30 by a neutralization reaction (dehydration condensation).

One example of the functional group generated on the resin bonding surface 22 includes at least one of a carboxyl group (—COOH), a carbonyl group (—CO—), or a hydroxy group (—OH) which are generated by the oxidative decomposition of the thermoplastic resin that makes the synthetic resin member 20. When the thermoplastic resin that makes the synthetic resin member 20 is a resin that contains sulfur atoms (heteroatoms), such as polyphenylene sulfide resin (PPS), as the functional group contained in the resin bonding surface 22, in addition to carboxyl groups, carbonyl groups, and hydroxy groups, the functional group containing heteroatoms such as sulfone groups (—SO3H), sulfonyl groups (—SO2-), sulfanyl groups (—SH), and disulfide groups (—SS—) may be contained.

As an example of the neutralization reaction that occurs by bonding the metal member 30 and the synthetic resin member 20 to each other, in a case where the resin bonding surface 22 has a carboxyl group (R—COOH) as a functional group and the metal member 30 is made of a divalent metal, the neutralization reaction occurs as illustrated in Equation (4) below.

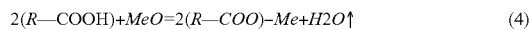

$$2(R\text{—COOH}) + MeO = 2(R\text{—COO})\text{-}Me + H2O\uparrow \quad (4)$$

In Equation (4), R is the main chain of the thermoplastic resin that makes the synthetic resin member 20, and Me is the metal that makes the metal member 30.

In a case where the first process is executed in an atmosphere of the oxygen-containing gas, the second temperature T2 is preferably a temperature at which the functional group of the resin bonding surface 22 of the synthetic resin member 20 and the metal oxide formed on the metal bonding surface 32 of the metal member 30 can form the covalent binding by the neutralization reaction. The second temperature T2 is preferably a temperature at which the water generated by the neutralization reaction is removed from the reaction system. Since the second temperature T2 varies depending on the functional group and the type of metal oxide, it is difficult to specify the second temperature T2 in general, but the second temperature T2 is more preferable to be equal to or higher than 100° C. because the water generated by the neutralization reaction is easily removed.

In the first process, the metal member 30 and the synthetic resin member 20 may be heated such that the entire metal member 30 and the synthetic resin member 20 reach the first temperature T1, but the metal member 30 and the synthetic resin member 20 may be heated such that at least the metal bonding surface 32 and the resin bonding surface 22 reach the first temperature T1.

In the second process, the pressure P when the synthetic resin member 20 is pressed against the metal member 30 is preferably a pressure which is equal to or higher than the compressive yield stress of the thermoplastic resin that makes the synthetic resin member 20. Since the pressure P varies depending on the thermoplastic resin that makes the synthetic resin member 20, it is difficult to specify the pressure P in general, but the pressure P is preferable to be 10 to 100 MPa.

In the present embodiment, a case where the pressing device 53 moves the synthetic resin member 20 toward the metal member 30 is described, but the metal member 30 may be moved toward the synthetic resin member 20.

In a case of locally bonding the metal member 30 and the synthetic resin member 20 as described in the present embodiment, the flat-surface shape of the bonding location may be any shape, such as point, line, and surface.

In the present embodiment, a case where the metal member 30 and the synthetic resin member 20 are pressurized and bonded to each other locally is described, but the synthetic resin member 20 and the metal member 30 may be bonded to each other over a wide range, such as pressurizing the entire surface of the resin bonding surface 22 or the metal bonding surface 32, or the like.

In the present embodiment, while the synthetic resin member 20 is pressed against the metal member 30, the temperature of the synthetic resin member 20, the metal member 30, and the surrounding thereof may be maintained at the second temperature T2. Otherwise, the synthetic resin member 20 may be continuously in contact with the metal member 30 in a pressurized state until the temperature of the synthetic resin member 20, the metal member 30, and the surrounding thereof is cooled to be equal to or lower than a predetermined temperature. In such a case, it is preferable to bring the synthetic resin member 20 into contact with the metal member 30 in a pressurized state until the temperature of the synthetic resin member 20, the metal member 30, and the surrounding thereof is cooled to be equal to or lower than a glass transition temperature Tg of the thermoplastic resin that makes the synthetic resin member 20.

In the present embodiment, a case where the synthetic resin member 20 molded into a predetermined shape in advance is compressed to the metal member 30 while being heated is described as the bonding process. However, by inserting the metal member 30 in which the anchor portion 34 is formed into an injection mold, and injecting the molten synthetic resin material toward the metal bonding surface 32 within the injection mold, the synthetic resin member 20 may be bonded to the metal member 30.

(6) Effect

In the metal-resin joint 10 of the present embodiment, the anchor portion 34 provided on the metal bonding surface 32 includes the plurality of partitions 37 having an undercut shape, and thus, it is possible to increase the bonding strength between the synthetic resin member 20 and the metal member 30.

Moreover, the plurality of partitions 37 inclined in the same direction are provided in the anchor portion 34 side by side in the direction Y in which the pair of protrusion strips 35 and 35 extend, and thus, it is possible to densely provide the partitions 37 having an undercut shape, it becomes easy to make the synthetic resin enter the space S formed between the partitions 37 when bonding the synthetic resin member 20, and it is possible to increase the bonding strength.

As described in the present embodiment, in a case where the space S formed between the partitions 37 is a space that becomes narrower in the first direction X as going further, it becomes easy to make the synthetic resin enter deeper into the space S when bonding the synthetic resin members 20, and it is possible to increase the bonding strength.

In the present embodiment, in a case where the inclination angle θ of the outer surface 34a of the pair of protrusion strips 35 with respect to the thickness direction of the metal member is smaller than 45 degrees, the plurality of anchor portions 34 can be close to each other in the first direction X, and thus, by providing the anchor portions 34 densely on the metal bonding surface 32, it is possible to increase the bonding strength.

In the present embodiment, in a case where the pair of protrusion strips 35 have an undercut shape such that the groove width of the recessed groove 36 becomes narrower as approaching the opening end of the recessed groove 36, the synthetic resin that has entered the upper recessed groove 36a also exerts an anchor effect and it is possible to increase the bonding strength.

In the present embodiment, in a case where the metal oxide is formed on the surface of the anchor portion 34, the functional groups of the resin bonding surface 22 of the synthetic resin member 20 bond to the metal oxide of the anchor portion 34 by dipolar interaction. In addition, the functional groups of the resin bonding surface 22 form a covalent binding with the metal oxide through a neutralization reaction (dehydration condensation). Therefore, it is possible to increase the bonding strength of the metal-resin joint 10.

In the present embodiment, in a case where the partitions 37 provided in the anchor portions 34 adjacent to each other in the first direction X are formed so as to be inclined in directions opposite to each other, the inclination direction of the partitions 37 is no longer biased in one direction, and it is possible to increase the bonding strength.

EXAMPLE

Hereinafter, Examples 1 to 10 and Comparative Examples 1 to 8 of the present disclosure will be described. The present disclosure is not limited to Examples 1 to 10.

In Examples 1 to 10 and Comparative Examples 1 to 8, by irradiating a single-mode laser having a laser wavelength of 1064 nm and a spot radius R of 0.03 mm, the anchor portion is formed on the metal bonding surface of the metal member. Then, a synthetic resin member is bonded to the metal bonding surface on which the anchor portion is formed. The conditions of the irradiated laser beam on the metal bonding surface of the metal members in Examples 1 to 10 and Comparative Examples 1 to 8 are illustrated in Table 1 described below.

The details of the metal member and the synthetic resin member which are used in Examples 1 to 10 and Comparative Examples 1 to 8, the dimension of the metal member, the dimension of the synthetic resin member, and the bonding area (overlap area) between the synthetic resin member and the metal member, are as follows.

SUS304: SUS304 with a surface oxidized and roughened by heating to the melting point of SUS304, which is 1450° C. or higher for one second by laser irradiation SPCC: SPCC with a surface oxidized and roughened by heating to the melting point of Fe, which is 1535° C. or higher for one second by laser irradiation Ti: Two types of pure titanium with a surface oxidized and roughened by heating to the melting point of Ti, which is 1668° C. or higher for one second by laser irradiation PPS resin: SUSTEEL (registered trademark) SGX120

Dimension of metal member: 18 mm×45 mm×1.6 mm

Dimension of synthetic resin member: 10 mm×40 mm×3.0 mm

Bonding area between metal member and synthetic resin member: 10 mm×5 mm

Each evaluation method is as follows.

(a) SEM Observation of Anchor portion

For the metal members of Examples 1 to 10 and Comparative Examples 1 to 8, in which the anchor portion is formed on the metal bonding surface, SEM observation of the anchor portion is performed in a state where the synthetic resin member 20 is not bonded. In a case where the plurality of partitions are inclined toward one side in the direction in which the pair of protrusion strips extend as going toward the distal end side and are formed side by side in the direction in which the pair of protrusion strips extend, the anchor portion is evaluated as excellent and "O" is indicated. In a case where the partition is not formed, the anchor portion is evaluated as defective, and "X" is indicated. The results are illustrated in Table 1 and FIGS. 6 to 13. As illustrated in FIGS. 6 to 11, in the metal members of Examples 1 and 6, in the recessed groove provided between the pair of protrusion strips, the plurality of partitions having an undercut shape are provided side by side in the direction in which the protrusion strips extend. In the metal members of Examples 2 to 5 and 7 to 10, the anchor portion having recessed grooves and partitions similar to those of Examples 1 and 6 is formed.

Meanwhile, as illustrated in FIGS. 12 and 13, in the metal members of Comparative Examples 1 and 5, a recessed groove is formed between the pair of protrusion strips, but no partition is formed in the recessed groove. In the metal member of the other Comparative Examples 2 to 4 and 6 to 8, similar to Comparative Examples 1 and 5, no partition is formed in the recessed groove.

(b) Bonding Strength

In the test method specified in JIS K 6850, the dimension of the metal member, the dimension of the synthetic resin member, and the bonding area between the synthetic resin member and the metal member are changed as described above, and with the other conditions set in accordance with the same standard, the measurement is performed at a tensile speed of 10 mm/min and a measurement temperature of 25° C. using a tensile tester (SHIMADZU CORPORATION, AUTOGRAPH AGX-V). Four specimens of Examples 1 to 10 and Comparative Examples 1 to 8 are made respectively, and the average value of the four measured values is used as the respective bonding strength.

TABLE 1

| | Metal member | Synthetic resin member | Spot gap M (mm) | Spot gap with respect to spot radius R | Laser power coefficient n | Intensity U (W/mm$^2$) | Anchor portion | Bonding strength (MPa) |
|---|---|---|---|---|---|---|---|---|
| Example 1 | SUS304 | PPS | 0.0005 | 0.017 | 8.95 | $5.60 \times 10^6$ | O | 24.5 |
| Example 2 | SUS304 | PPS | 0.00005 | 0.002 | 89.52 | $5.60 \times 10^6$ | O | 20.6 |
| Example 3 | SUS304 | PPS | 0.0005 | 0.017 | 7.96 | $3.52 \times 10^6$ | O | 21.8 |
| Example 4 | SUS304 | PPS | 0.001 | 0.033 | 8.95 | $1.49 \times 10^7$ | O | 19.5 |
| Example 5 | SUS304 | PPS | 0.005 | 0.167 | 1.79 | $1.49 \times 10^7$ | O | 18.8 |
| Example 6 | SPCC | PPS | 0.0005 | 0.017 | 9.39 | $5.60 \times 10^6$ | O | 25.3 |
| Example 7 | SPCC | PPS | 0.00005 | 0.002 | 93.87 | $5.60 \times 10^6$ | O | 18.3 |
| Example 8 | SPCC | PPS | 0.0005 | 0.017 | 8.34 | $3.52 \times 10^6$ | O | 20.4 |
| Example 9 | Ti | PPS | 0.0005 | 0.017 | 11.22 | $5.60 \times 10^6$ | O | 25.1 |
| Example 10 | Ti | PPS | 0.0005 | 0.017 | 9.98 | $3.52 \times 10^6$ | O | 23.7 |
| Comparative Example 1 | SUS304 | PPS | 0.01 | 0.333 | 0.09 | $4.34 \times 10^5$ | X | 13.2 |
| Comparative Example 2 | SUS304 | PPS | 0.000025 | 0.001 | 318.28 | $9.95 \times 10^6$ | X | 10.5 |
| Comparative Example 3 | SUS304 | PPS | 0.005 | 0.167 | 1.79 | $1.49 \times 10^9$ | X | 12.8 |
| Comparative Example 4 | SUS304 | PPS | 0.1 | 3.333 | 0.09 | $1.49 \times 10^7$ | X | 10.1 |

TABLE 1-continued

|  | Metal member | Synthetic resin member | Spot gap M (mm) | Spot gap with respect to spot radius R | Laser power coefficient n | Intensity U (W/mm$^2$) | Anchor portion | Bonding strength (MPa) |
| --- | --- | --- | --- | --- | --- | --- | --- | --- |
| Comparative Example 5 | SPCC | PPS | 0.01 | 0.333 | 0.09 | 4.34 × 10$^5$ | X | 15.8 |
| Comparative Example 6 | SPCC | PPS | 0.1 | 3.333 | 0.09 | 1.49 × 10$^7$ | X | 9.5 |
| Comparative Example 7 | Ti | PPS | 0.01 | 0.333 | 0.11 | 1.12 × 10$^6$ | X | 14.1 |
| Comparative Example 8 | Ti | PPS | 0.1 | 3.333 | 0.11 | 1.49 × 10$^7$ | X | 8.9 |

The results are illustrated in Table 1. In the metal-resin joints of Examples 1 to 10, it is possible to confirm that the bonding strength between the synthetic resin member and the metal member is significantly improved compared to Comparative Examples 1 to 8.

REFERENCE SIGNS LIST 10 metal-resin joint
20 synthetic resin member
22 resin bonding surface
30 metal member
32 metal bonding surface
34 anchor portion
35 protrusion strip
35a outer surface
35b inner surface
36 recessed groove
36a upper recessed groove
36b lower recessed groove
37 partition

The invention claimed is:

1. A metal-resin joint in which a synthetic resin member made of thermoplastic resin and a metal member made of metal are provided, and the synthetic resin member is bonded to a metal bonding surface of the metal member provided with an anchor portion, wherein
the anchor portion has a pair of protrusion strips protruding from the metal bonding surface with a gap, a recessed groove provided between the pair of protrusion strips, and a plurality of partitions protruding from a groove bottom of the recessed groove, and
the plurality of partitions are provided to be inclined toward one side in a direction in which the pair of protrusion strips extend as going toward a distal end side, and to be side by side in the direction in which the pair of protrusion strips extend.

2. The metal-resin joint according to claim 1, wherein an inclination angle of an outer surface of the pair of protrusion strips with respect to a thickness direction of the metal member is less than 45 degrees.

3. The metal-resin joint according to claim 1, wherein the pair of protrusion strips have an undercut shape in which an opening end of the recessed groove becomes narrower.

4. The metal-resin joint according to claim 1, wherein a metal oxide is provided on a surface of the anchor portion.

5. The metal-resin joint according to claim 1, wherein a plurality of the anchor portions are provided side by side in a direction perpendicular to the direction in which the pair of protrusion strips extend on the metal bonding surface, and the plurality of partitions provided in the anchor portions adjacent to each other are inclined in directions opposite to each other.

6. The metal-resin joint according to claim 2, wherein the pair of protrusion strips have an undercut shape in which an opening end of the recessed groove becomes narrower.

7. The metal-resin joint according to claim 2, wherein a metal oxide is provided on a surface of the anchor portion.

8. The metal-resin joint according to claim 3, wherein a metal oxide is provided on a surface of the anchor portion.

9. The metal-resin joint according to claim 2, wherein a plurality of the anchor portions are provided side by side in a direction perpendicular to the direction in which the pair of protrusion strips extend on the metal bonding surface, and the plurality of partitions provided in the anchor portions adjacent to each other are inclined in directions opposite to each other.

10. The metal-resin joint according to claim 3, wherein a plurality of the anchor portions are provided side by side in a direction perpendicular to the direction in which the pair of protrusion strips extend on the metal bonding surface, and the plurality of partitions provided in the anchor portions adjacent to each other are inclined in directions opposite to each other.

11. The metal-resin joint according to claim 4, wherein a plurality of the anchor portions are provided side by side in a direction perpendicular to the direction in which the pair of protrusion strips extend on the metal bonding surface, and the plurality of partitions provided in the anchor portions adjacent to each other are inclined in directions opposite to each other.

* * * * *